United States Patent
Mehnert et al.

[15] 3,671,850
[45] June 20, 1972

[54] ELECTRIC GENERATOR CONTROL SYSTEM WITH RADIO FEEDBACK LOOP

[72] Inventors: Walter E. Mehnert, Elvira-Strasse 29; Horst A. Heller, Pfarrer-Grimm Strasse 24, both of Munich, Germany

[22] Filed: Nov. 19, 1970

[21] Appl. No.: 91,196

Related U.S. Application Data

[63] Continuation-in-part of Ser. No. 724,478, April 26, 1968.

[52] U.S. Cl. .................................322/28, 310/68 R, 322/73
[51] Int. Cl. .........................................................H02p 9/30
[58] Field of Search..............322/28, 73; 310/68 R; 318/16; 343/225, 228

[56] References Cited

UNITED STATES PATENTS 3,401,328 9/1968 Hartung...................................322/28
3,412,271 11/1968 Hall.......................................310/68 R Primary Examiner—Lewis H. Myers
Assistant Examiner—H. Huberfeld
Attorney—John J. Byrne

[57] ABSTRACT

The illustrated embodiments include an exciting generator and a power generator. Each of the generators includes a common tubular rotor. The armature of the exciting generator is maintained within the rotor and is fed through a control rectifier to the field of the power generator, which is also maintained within the rotor. The output voltage of the power generator is sampled for modulation of a radio transmitter which delivers power to a transmitting antenna. A receiving means maintained within the tubular rotor receives and demodulates the signal from the transmitter. The demodulated signal, together with the output of the field generator armature is applied to the control elements of the control rectifier and thus determines the intensity of the power generator field and, correspondingly, the output of the power generator.

3 Claims, 2 Drawing Figures

ELECTRIC GENERATOR CONTROL SYSTEM WITH RADIO FEEDBACK LOOP

This is a continuation-in-part application of our copending application Ser. No. 724,478; filed Apr. 26, 1968; titled ELECTRIC GENERATOR CONTROL SYSTEM.

1. Field of the Invention

This invention generally relates to an electric generator control system particularly adapted for use with aerospace vehicles.

2. Background of the Invention

Various means for the control of the output voltage of generator systems have heretofore been described. Such arrangements have usually sampled the generator output voltage and applied the sampled voltage through brushes to the field coil of the generator. Characteristic of such systems is a relatively large time constant, as a result of which the field voltage is incapable of rapidly accommodating fluctuating or transient loads. Additionally, the use of brushes often results in increased maintenance problems, especially under extreme variations in environmental conditions such as are experienced in aerospace vehicles. The net effect is an increased maintenance problem and a decrease in operational safety and reliability.

A further system of interest regarding the present invention is that disclosed in U.S. Pat. No. 3,401,328 to Hartung. The Hartung patent discloses a brushless synchronous machine wherein the output of a transformer connected to an A.C. generator is used to control the conduction angle of an SCR bridge connected between the armature of the exciter generator and the field winding of a synchronous generator and to hence control the excitation provided. However, the range of exciting current provided in accordance with the present invention is much greater than that provided in the Hartung system and, as discussed hereinbelow, a number of other important differences exist between the two systems.

SUMMARY OF THE INVENTION

With respect to the illustrated embodiments, the armature of an exciting generator is located within a hollow rotor common to both the exciting generator and a power generator. The output voltage from the exciting generator, which is controlled by controlled rectifiers, is fed to the field winding of the power generator, providing a broad control range to the field winding. The control signals for the controlled rectifiers are provided by means of a radio frequency transmission system which includes a modulatable transmitter whose output is modulated in accordance with the output voltage of the power generator and a receiver mounted in the generator rotor. The output of the receiver is demodulated and, together with the exciting generator output serves to control the firing point of the controlled rectifiers.

One feature of the illustrated embodiments is that the time constant of the system is relatively small, generally comprising the time constant of the regulator and that of the power generator. The response time of the system is substantially less than that of comparable known systems and is a particularly desirable feature in the event the load is subjected to transient or fluctuating loads.

As described hereinbelow, thyristors serve as the controlled rectifiers. Thyristors are particularly suitable for aircraft rotating equipment, since they are relatively insensitive to vibration, changes in altitude, extreme temperature environments, and accelerative forces. Additionally, they afford relatively fine control.

In accordance with a further important feature of the present invention, two superimposed control voltages are applied to the gates of the controlled rectifiers. Specifically, the armature voltage of the power generator coupled by means of a radiofrequency transmission system to a control unit for controlling the firing angle of the rectifiers provides fine control of the rectifiers, and the output voltage of the exciting generator is applied to the control unit to provide broad control of the rectifiers. In the event of failure of one of those feedback loops, the system will not be completely inoperative, but will only lose a degree of control. The voltage supplied from the exciting generator is not subject to outside influences and hence the possibility of a complete system breakdown such as might otherwise be caused by a fault in the fine control loop is substantially eliminated. The system of the invention provides saturation control so that an extremely large range of exciter current is available, from plus 100 percent to minus 100 percent (counter-excitation). In this way, the dangerous voltage increases of overexcitation caused when reactive loads are switched off are controlled.

It is a main object of this invention to provide an improved generator control system. A further objective is to provide a control system having relatively high response time so as to facilitate accommodation to transient and fluctuating loads. Other objects and advantages of the invention will become apparent through reference to the following description and accompanying drawings which show illustrative embodiments of this invention.

DESCRIPTION OF THE PREFERRED EMBODIMENT

Figure 1:
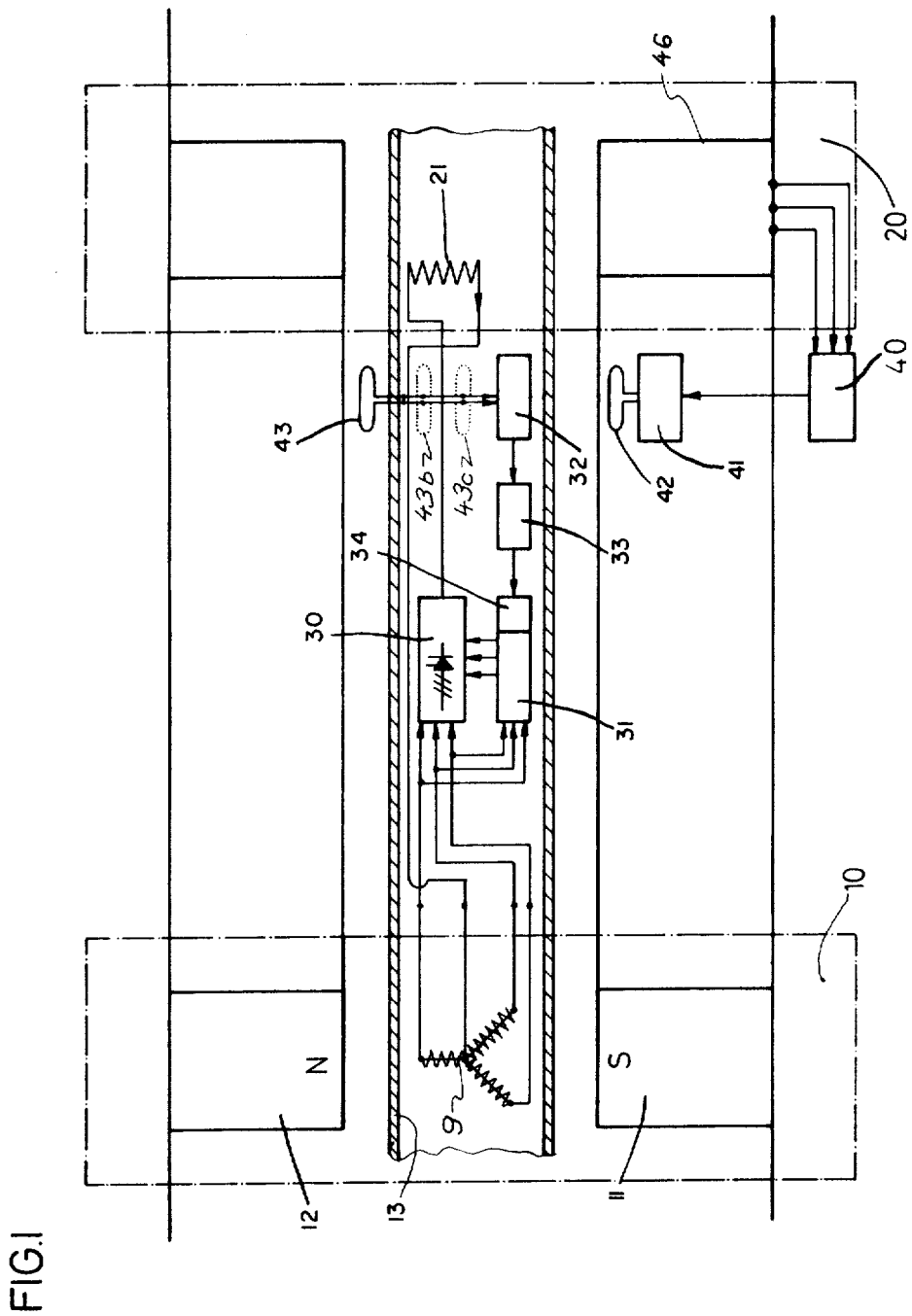
FIG. 1 is a diagrammatic illustration of a generator system embodying certain features of this invention.

Referring in particular to Fig. 1, the illustrated embodiment includes a three-phase exciting generator 10. The magnetic field of the exciting generator 10 is created by permanent magnets 11 and 12. The exciting generator 10 includes a three-phase Y-connected armature 9 which provides the field excitation for a power generator 20, as will be further described. A tubularly shaped rotor 13 is common to the two generators. Voltage is supplied to a field winding 21 of the power generator 20 through a controlled rectifier 30. While various types of controlled rectifiers may be used in this application, thyristors have been found particularly satisfactory. An example of a suitable thyristor is the silicon controlled rectifier (SCR) manufactured by the General Electric Company. The control voltage for the thyristors is provided by a control unit 31 which controls the firing angle of the controlled rectifier 30. The control unit 31 may take a number of forms such as discussed at chapter 4 of the General Electric Controlled Rectifier Manual, first edition. Further a commercially available firing unit such as the "Vectrol" SCR firing unit No. VS–6332ET may be used. One input to control unit 31 is connected to the armature 9, the output of the control unit 31 by controlling the firing angle of the controlled rectifier supplies field voltage to the power determining generator 20 and thus the output terminal voltage thereof.

The output voltage of a power generator armature 46 is sampled and utilized to control the field voltage of the power generator. This is accomplished by connecting the armature voltage to a voltage regulator 40 the time varying output of which serves as the modulating input to a modulatable radiofrequency transmitter 41. The system of the invention preferably utilizes pulse code modulation and hence transmitter 41 includes conventional sampler, quantizer and encoding circuits. The pulse code modulation system used can take a combination of different conventional forms and reference is made to Schwartz, Information Transmission Modulation and Noise at pp. 318 to 333 for a discussion of such systems. See also L. A. Mecham and E. Peterson, An Experimental Multichannel Pulse Code Modulation System of Toll Quality, Bell System Tech. J., Vol. 27, K15, pp. 1–43, January, 1948, for an early system. The output of the transmitter 41 is coupled to a transmitting antenna 42 which may be a simple loop antenna.

Receiving the signal from the transmitting antenna 42 is a receiving antenna 43 which is mounted upon the rotor 13.

Receiving antenna 43 may also be a small loop antenna. Alternate antenna positions 43b and 43c are also indicated. The signal from the receiving antenna 43 is coupled to a receiver 32, the output of which is demodulated by a detector 33. The receiver 32 and detector 33 may be part of a receiver unit which includes appropriate decoders, holding circuits and filters found in conventional pulse code modulated systems. The output of the detector 33 is fed through a matching control unit 34 and is superimposed upon the signal from the control unit 31 and applied to the gates of the thyristors 30. As stated hereinabove, the output of matching unit 34 is used to provide fine control of the firing angle of controlled rectifier 30. As a result of the illustrated construction, the failure of the control voltage from the armature 46 of the power generator 20 due to a malfunction of the transmitter 40, or the receiver 42, or related components will not cause an interruption in the power generator output.

The excitation voltage appearing at the output of detector 33, which, as described hereinabove, is superimposed on the direct input to control unit 31 provided by the direction connection from armature 9, varies between full positive excitation to full negative (counter excitation) whereas the direct input voltage from armature 9 is fixed and dictates a firing angle for controlled rectifier 30 that will insure sufficient excitation under normal operating conditions.

DESCRIPTION OF THE ALTERNATE EMBODIMENT

Figure 2:
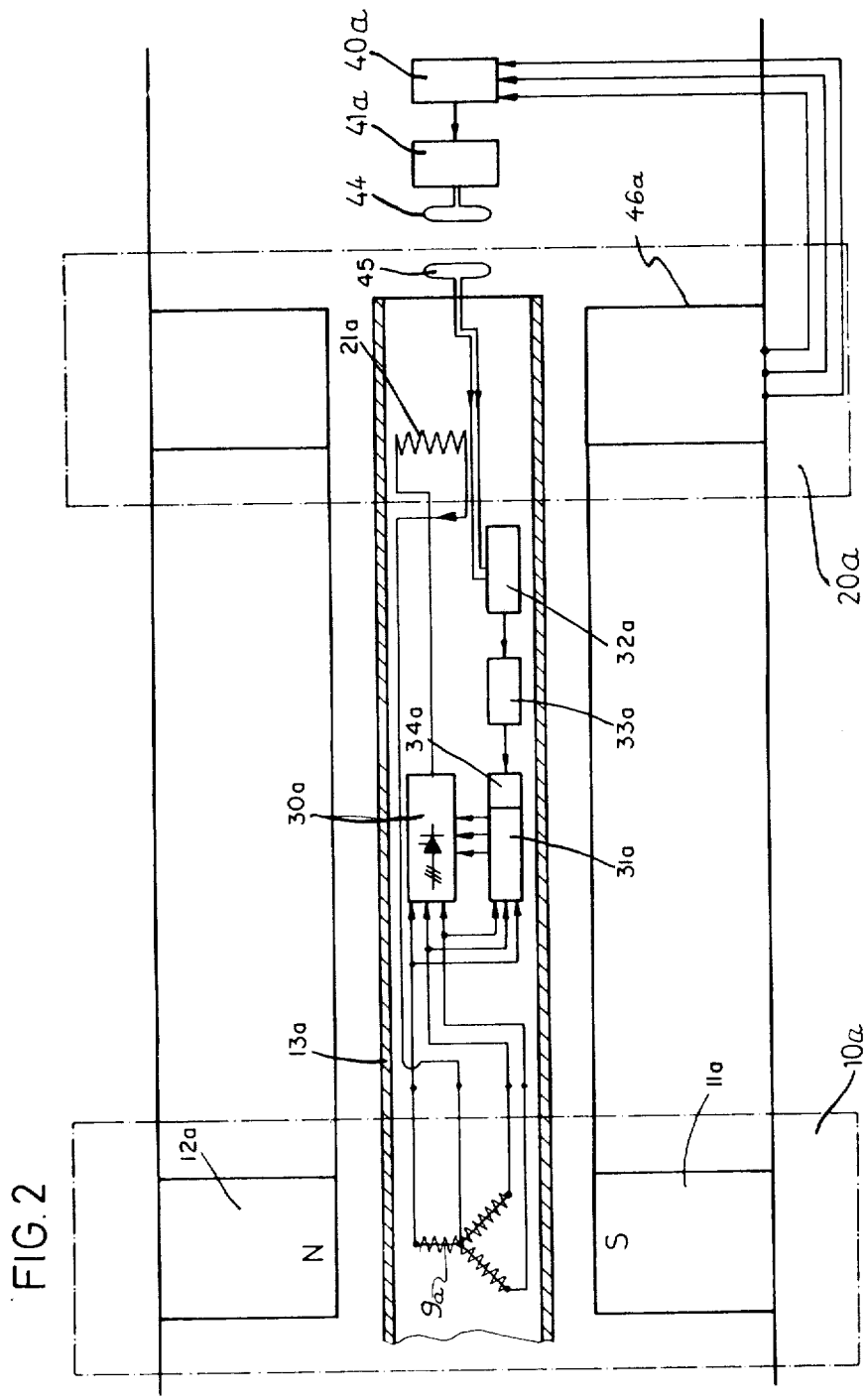
FIG. 2 is a diagrammatic illustration of an alternate embodiment of a generator system embodying certain features of this invention.

With reference to Fig. 2, those elements which correspond to those in Fig. 1 are designated by the suffix a. The output of the transmitter 41a is fed to a transmitting antenna 44 which is positioned adjacent the end of the rotor shaft 13a. The signal from the transmitting antenna 44 is coupled to a receiving antenna 45 mounted upon the adjacent end of the rotor 13a. The signal from the antenna 45 is coupled to the receiver 32a and processed in a manner similar to that described in connection with Fig. 1.

Although but two specific embodiments of the invention have been herein shown and described, it should be understood that certain details of the construction shown may be altered without departing from the spirit and scope of this invention as defined by the following claims.

We claim:

1. An electrical generator system comprising a power generator, an exciting generator for supplying an excitation voltage to the field of said power generator to control the magnetic field thereof, a common shaft for mounting said power generator and said exciting generator, controlled rectifier means for controlling the excitation voltage supplied to said field of said power generator, the range of excitation being variable between positive and negative values and the latter providing counter-excitation, radiofrequency transmitting means coupled to the output of said power generator including voltage regulator means connected to said power generator and means for producing a pulse-code modulated signal in accordance with the output of said generator, radiofrequency receiving means for receiving the pulse-code modulated signal produced by said transmitting means, electromagnetic means for electromagnetically coupling said transmitting means and said receiving means, and control means responsive to the output of said radio receiving means for controlling said controlled rectifier means and hence the excitation voltage supplied to said power generator, said system further comprising means for directly connecting the output of said exciting generator to the said control means to provide direct control of the excitation voltage in addition to the feedback control provided by said voltage regulator means, said control means and said connecting means being mounted within said shaft to provide shielding from external influences.

2. A system as claimed in claim 1 further comprising means for connecting the voltage output of the armature of said exciting generator to said control means to provide coarse control thereof.

3. A system as claimed in claim 2 wherein said electromagnetic means comprises a transmitting antenna and a receiving antenna.

* * * * *